July 16, 1963    F. CALKIN    3,097,439
SCARIFIER ATTACHMENT
Filed Jan. 12, 1962    2 Sheets-Sheet 1
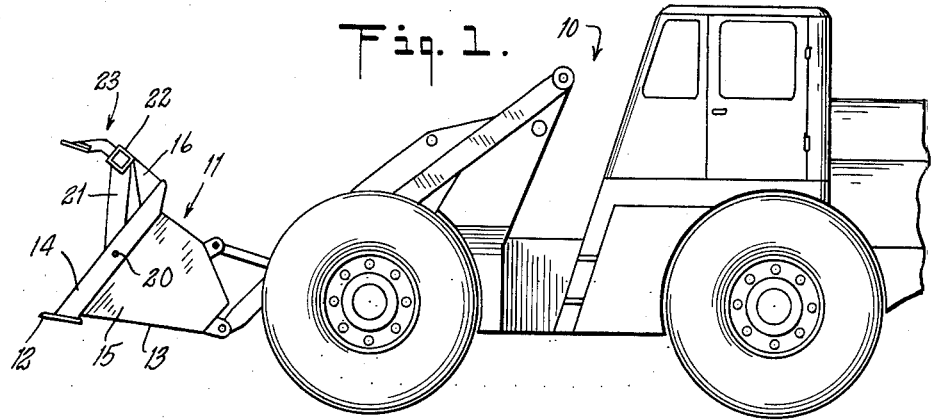
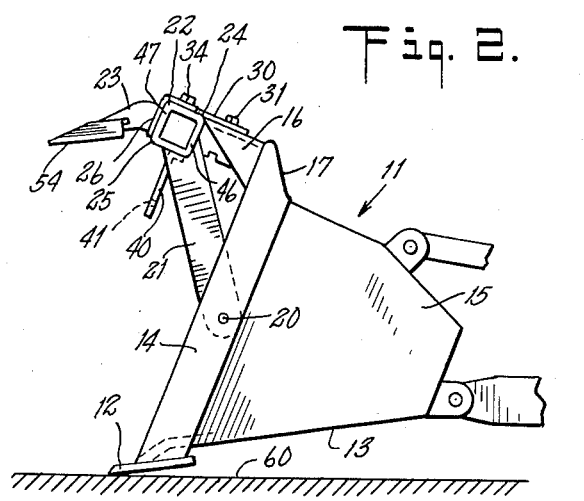
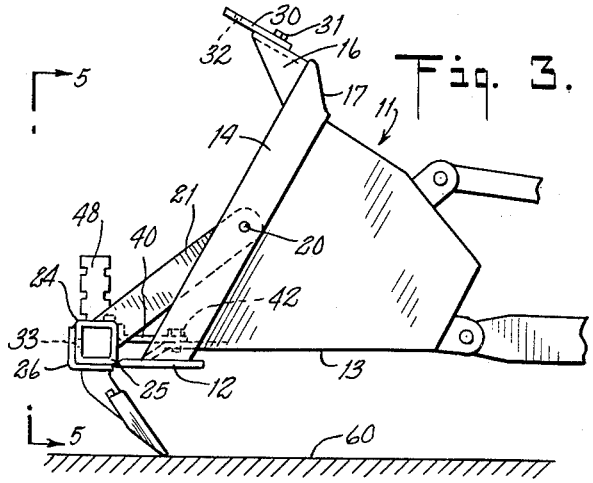
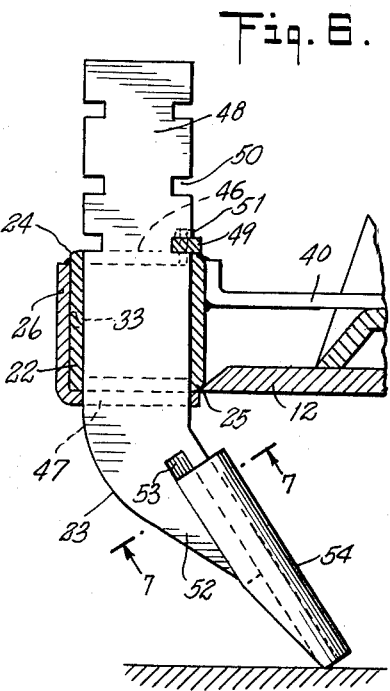
INVENTOR.
FENTON CALKIN
BY
ATTORNEY July 16, 1963
F. CALKIN
3,097,439
SCARIFIER ATTACHMENT
Filed Jan. 12, 1962
2 Sheets-Sheet 2
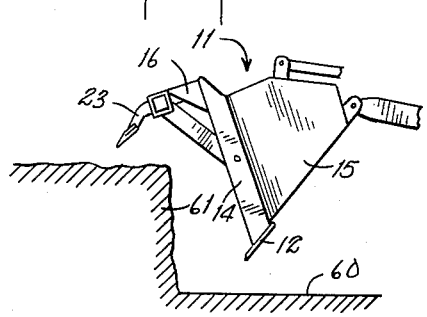
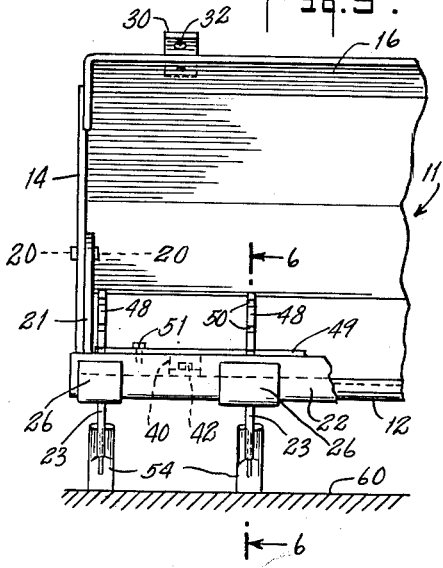
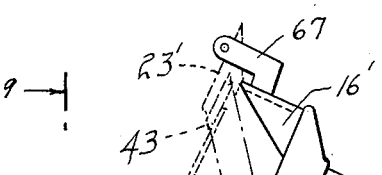
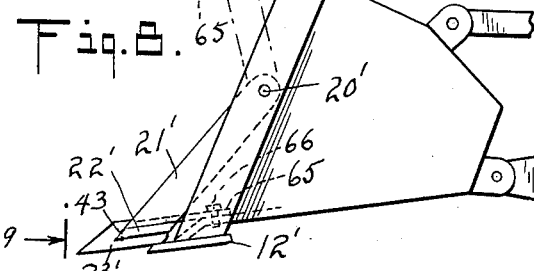
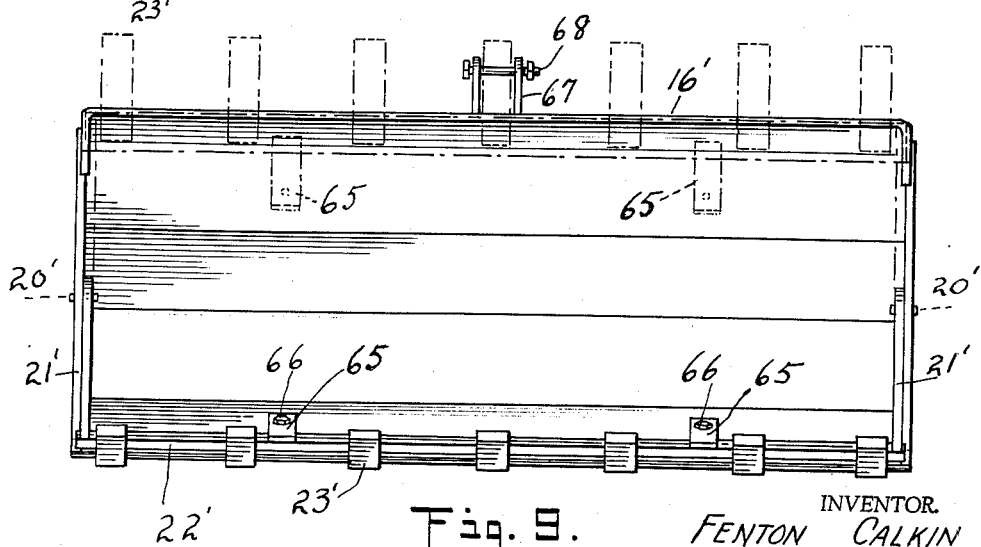
INVENTOR.
FENTON CALKIN
BY
ATTORNEY 3,097,439
SCARIFIER ATTACHMENT
Fenton Caikin, 62 W. Cedar Place, Ramsey, N.J.
Filed Jan. 12, 1962, Ser. No. 165,783
4 Claims. (Cl. 37—117.5)

This invention relates to earth working machinery and more particularly to a bucket scoop for an earth working machine provided with earth ripping teeth.

The principal object of the invention is to provide earth ripping teeth on the scoop of an earth working machine in such manner that the scoop may be readily employed to level or scarify the ground, to rip down banks or hills of earth, and to load loosened earth and rubble into a suitable conveyor for removal.

Other objects of the invention as well as the advantages and features of novelty thereof will be apparent from a perusal of the following description, when read in connection with the accompanying drawings, in which FIG. 1 is a side elevational view of a conventional type of bulldozer having a bucket or scoop provided with earth ripping teeth constructed in accordance with the invention;

FIG. 2 is an enlarged side elevational view of the scoop with the teeth secured in raised position so as not to interfere with scraping and loading operations of the scoop;

FIG. 3 is a view similar to FIG. 2 but showing the teeth secured in lowered position and the bucket or scoop arranged to enable the teeth to scarify the ground;

FIG. 4 is a view similar to FIG. 2 in which the teeth are secured in raised position on the scoop, and showing the scoop being handled to enable the teeth to perform a ripping operation on a bank of earth;

FIG. 5 is a front elevational view looking along the line 5—5 of FIG. 3 at one end portion of the scoop;

FIG. 6 is a side elevational view of one of the teeth, the view being taken along the line 6—6 of FIG. 5;

FIG. 7 is a sectional view taken along the line 7—7 of FIG. 6;

FIG. 8 is a side elevational view of a scoop embodying a modified form of the invention and showing in full lines the teeth in lowered position and in dotted outline the teeth secured in raised position; and FIG. 9 shows a front elevational view of the scoop illustrated in FIG. 8.

In the drawings, the numeral 10 indicates generally a known type of earth working machine with which the improved bucket or scoop of the invention may be used. It is to be understood that the scoop of this invention may be used to equal advantage with other known types of earth working machines which employ blades, buckets, scoops, etc., for ripping and/or scarifying the earth, and/or loading earth and rubble loosened or dislodged by such ripping and/or scarifying operations. Equipment of the indicated type is provided with power cylinders and suitable linkage of known construction to raise and lower the bucket or scoop 11, to tilt it at various angles to the horizontal for loading and discharging operations, and to adequately support the scoop as it is driven forwardly in scooping or loading operations, or drawn rearwardly in scarifying operations. As is also conventional, the bucket or scoop 11 is provided with a high carbon scraper blade 12 riveted to the front or outer edge of the bottom wall 13 of the bucket, and is stiffened or rigidified by side plates 14, 14 secured to the forward or outer edges of the side walls 15, 15 thereof, and by a flanged beam 16 secured to the upper or outer end of the top wall 17 of the bucket.

It will be noted from a comparison of FIGS. 2 and 3 of the drawings, that the outer edges of the blade 12 and the flanged beam 16 substantially lie in a curved plane whose radii center at an axis of rotation 20—20 that passes through the central portions of the side plates 14, 14.

Pivotally connected at one end to the side plates 14, 14 for oscillatory movement about the axis 20—20, are two arms 21, 21, to the outer ends of which is secured a transverse beam or frame 22 for carrying the scarifier teeth 23. The frame 22 is a hollow member of rectangular and preferably square cross-section and is connected to the arms 21, 21, so that at the upper end of the range of movement of such arms (FIG. 2) one corner edge 24 of such frame will engage with the outer edge of the flanged beam 16, while at the other, lower end of the range of movement of such arms (FIG. 3), a corner edge 25 of such frame directly opposite edge 24 thereof, will engage with the outer edge of the scraper blade 12. Edges 24 and 25 of the frame 22 therefore are in the curved plane containing the outer edges of the blade 12 and beam 16 and are disposed on opposite sides of and are offset from the arms 21, 21. It will be noted that the outer sides of the frame 22 are reinforced by a plurality of spaced angle members 26 secured in welded relation to such frame and the ends of each of which terminate at the edges 24, 25 to provide substantial angularly shaped seating surfaces at such edges for the outer edges of the scraper blade 12 and beam 16.

The transverse frame 22 may be securely locked in its retracted raised position (FIG. 2) to the flanged beam 16 by a pair of straps 30, each of which is swingably secured at one end to the beam 16 by any suitable means such as a bolt 31. The outer end of each of the straps 30 is provided with a hole 32 which aligns with a hole 33 located in an outer wall of the frame 22 between a pair of the angle members 26, the two holes when aligned being receptive of a suitable fastening pin or bolt 34.

In its advanced lowered position the transverse frame 22 may be securely locked to the scraper blade 12 by a pair of angle members 40 in FIGS. 3, 5 and 6, welded or bolted to an inner side wall of the frame 22 adjacent to the ends of such frame so that a bolt hole on each of the projecting arms thereof will come into alignment with a bolt hole provided in the bottom wall 13 of the bucket in the fully advanced position of frame 22 in which it is in engagement with the scraper blade 12. A bolt 42 is passed through each set of the aligned holes to fasten the angle members 40 and consequently the frame 22 to the bucket.

As is shown more clearly in FIGS. 2, 5 and 6 of the drawings, the pair of opposed inner and outer walls 46, 47, respectively, of the transverse frame 22 are provided with aligned slots to slidably receive the shanks 48 of the scarifier teeth 23. The slots are of a length equal to the distance between the inner faces of the other two opposed inner and outer walls of the frame so that the edges of the shanks 48 which have a width approximately equal to such distance, bear against and are supported by said other walls against transverse forces exerted on such teeth. The teeth are fixed in position on the transverse frame by a transverse locking rod 49 which latches in the locking grooves 50 formed in the edges of the shanks 48 and which is secured by bolts 51 to the inner frame wall 46. Locking grooves 50 are provided on both edges of each shank 48 to enable different adjustments and positions to be made of the scarifier teeth on the frame 22. The shank 48 of each tooth 23 is provided with an offset end or heel portion 52 on each side of which is provided a longitudinally extending inclined groove 53. The pointed end of each tooth is constituted of a somewhat tubularly-shaped piece 54 of suitable steel bent into a C-form in cross-section to provide two opposed side edges which are slidably received in the grooves 53. One end of the side edges is beveled to provide the projecting end of the tooth piece 54 with a somewhat pointed configuration.

It will be understood from the foregoing that the teeth may be secured in raised position to enable the scraper blade 12 to cut into the ground 60 to level the ground, or to pick up loose dirt or rubble. In these operations the teeth are not used and because of their raised position, they in no way interfere with the scaping and/or loading operations. By tilting the bucket, however, as is shown in FIG. 4, the teeth may be manipulated to tear down banks 61 or hills of dirt. When sufficient of the bank has been ripped away by the teeth, the bucket can again be retracted to enable the bladed end to pick up the loosened dirt from the bank and load it into a conveyor.

It will be noted that the aforesaid scooping, ripping and loading operations are all carried out with the teeth secured in raised position. When, however, it is necessary to use the teeth as a scarifying tool because of the condition of the ground, the teeth are lowered and locked in lowered position against the scraper blade 12 as shown in FIG. 3 of the drawings. In this position of the teeth, in which the working ends 54 thereof are disposed wholly below the blade 12, they are enabled to bite into the ground as the scoop is drawn back and thereby rip up the ground and loosen it. The scraper blade 12 then may be effectively employed to scrape off and load the loosened dirt and rubble when the teeth are again raised and secured in such raised condition. The raising and lowering of the teeth are readily accomplished manually, it being understood, however, that it is within the contemplation of this invention to employ mechanical means such as a cable or chain, or hydraulic means in order to assist the operator, or accomplish such pivotal movement of the teeth automatically.

In the embodiment illustrated in FIGS. 8 and 9 of the drawings, the beam or frame 22 is in the nature of a plate 22' which is secured on the arms 21', 21' so that it will be in substantial parallellism with the bucket cutter 12' when the teeth 23' are in lowered position. In the type of bucket illustrated, the plate 22' is approximately 86" long x 5" wide x 1" thick and is made of cutting edge steel. The plate 22' is provided with a single opposite bevel 43 on each side. The shanks of the teeth 23' are provided with longitudinally extending slots which receive the plate 22' and such shanks are removably secured to plate 22' in any suitable fashion, as by welding. It will be observed from FIG. 8 of the drawings that in this construction, one side of the inner ends of the teeth shanks will engage with the bucket scraper blade 12' in the lowered position of such teeth, and when the teeth are in raised position, the portions of the teeth adjacent to the ends of the slots and on the opposite side thereof, will engage with the outer edge of the flanged beam 16'. Thus in this construction, the teeth rather than the frame 22 constitute the stop means engageable with the scraper blade 12' and beam 16' to define the range of movement of the teeth.

The teeth are secured in lowered position to the bucket by two steel plates 65, one end of each of which is permanently welded to the plate 22' at places intermediate the teeth 23' and so that such plates project beyond the inner longitudinal edge of the plate 22' in a direction opposite to that in which the teeth extend from such plate. The plates 65 are of sufficient length to enable them to be secured as by bolts 66 to the bottom wall 13 of the bucket in the manner described with relation to the angle members 40.

The teeth 23' are secured in raised position by means of a bracket 67 secured to the flanged beam 16' approximately midway of the length of the latter and provided with two spaced arms adapted to straddle one of the teeth 23'. A bolt 68 threaded through the ends of the bracket arms secures the teeth to the beam 16'.

While I have herein illustrated and described a preferred embodiment of my invention, it will be apparent to those skilled in the art that various changes and modifications thereof may be made without departing from the spirit of the invention or the scope of the appended claims.

I claim:

1. In an earth working machine, in combination, a front end loader bucket provided at its bottom end with a scraper blade projecting forwardly and outwardly therefrom, and provided at its upper end with a rigid transverse member arranged in substantial parallelism with said scraper blade and projecting forwardly and outwardly from said bucket, and said bucket having rigid side members between the ends of said blade and transverse member, a pair of arms pivotally connected to said side members for pivotal movement about a transverse axis located approximately midway between said blade and transverse member and disposed in substantial parallelism with the latter, a rigid transverse beam mounted on the outer ends of said arms and having oppositely directed surface portions disposed in opposed relation to the outer edges of said blade and transverse member, said surface portions and said outer edges being substantially located in a curved plane whose radii center at said transverse axis so that said surface portions are alternately engageable with said outer edges at the ends of the range of movement of said rigid beam and said pivoted arms, means for removably securing said rigid beam to said blade and to said transverse member, and a plurality of scarifier teeth secured to said transverse beam.

2. In an earth working machine, in combination, a front end loader bucket provided at its bottom end with a scraper blade projecting forwardly and outwardly therefrom, and provided at its upper end with a rigid transverse member arranged in substantial parallelism with said scraper blade and projecting forwardly and outwardly from said bucket, and rigid side members secured to said bucket and extending from the ends of said scraper blade to the ends of said transverse member, a pair of arms pivotally connected at their inner ends to said side members for pivotal movement about a transverse axis located approximately midway between said blade and transverse member and disposed in substantial parallelism with the latter, a rigid transverse beam mounted on the outer ends of said arms, said beam being hollow and of rectangular cross-section and so arranged on said arms that oppositely disposed corner edges thereof are offset from said arms and disposed in opposed relation to the outer edges of said blade and transverse member, said corner edges and said outer edges being substantially located in a curved plane whose radii center at said transverse axis so that said corner edges are alternately engageable with said outer edges at the ends of the range of movement of said rigid beam and said pivoted arms, means for removably securing said rigid beam to said blade, means for removably securing said rigid beam to said transverse member, a plurality of scarifier teeth slidably mounted in said rigid beam, and means for locking said teeth in position on said beam.

3. In an earth working machine, in combination, a front end loader bucket provided at its bottom end with a scraper blade projecting forwardly and outwardly therefrom, and provided at its upper end with a rigid transverse member arranged in substantial parallelism with said scraper blade and projecting forwardly and outwardly from said bucket, and said bucket having rigid side members between the ends of said blade and transverse member, a pair of arms pivotally connected to said side members for pivotal movement about a transverse axis located approximately midway between said blade and transverse member and disposed in substantial parallelism with the latter, a rigid transverse beam mounted on the outer ends of said arms, and a plurality of teeth secured to said transverse beam, the unit constituting said beam and teeth having oppositely directed surface portions disposed in opposed relation to the outer edges of said blade and transverse member, said surface portions and said outer edges being substantially located in a curved plane whose radii center at said transverse axis so that said surface portions are alternately engageable with said outer edges at the ends of the range of movement of said rigid beam and said pivoted arms, and means for removably securing said rigid beam to said blade and to said transverse member.

4. An earth working machine such as defined in claim 3, in which said beam is a flat elongated plate and in which the shanks of said teeth are provided with longitudinally extending slots receivable of said plate, and including means to secure the teeth in assembled relation on said plate, said engageable surface portions being provided on the sides of said teeth between which said slots and said plate are located.

References Cited in the file of this patent
UNITED STATES PATENTS

| | | |
|---|---|---|
| 846,278 | Bagley | Mar. 5, 1907 |
| 2,219,160 | White | Oct. 22, 1940 |
| 2,262,415 | Williams et al. | Nov. 11, 1941 |
| 2,615,262 | Reid | Oct. 28, 1952 |
| 2,698,492 | Justice | Jan. 4, 1955 |
| 2,699,104 | Jaeger | Jan. 11, 1955 |